Oct. 18, 1938.　　　　M. PURITZ　　　2,133,399
ELECTRIC CABLE AND METHOD OF REPAIRING THE SAME
Original Filed April 25, 1929
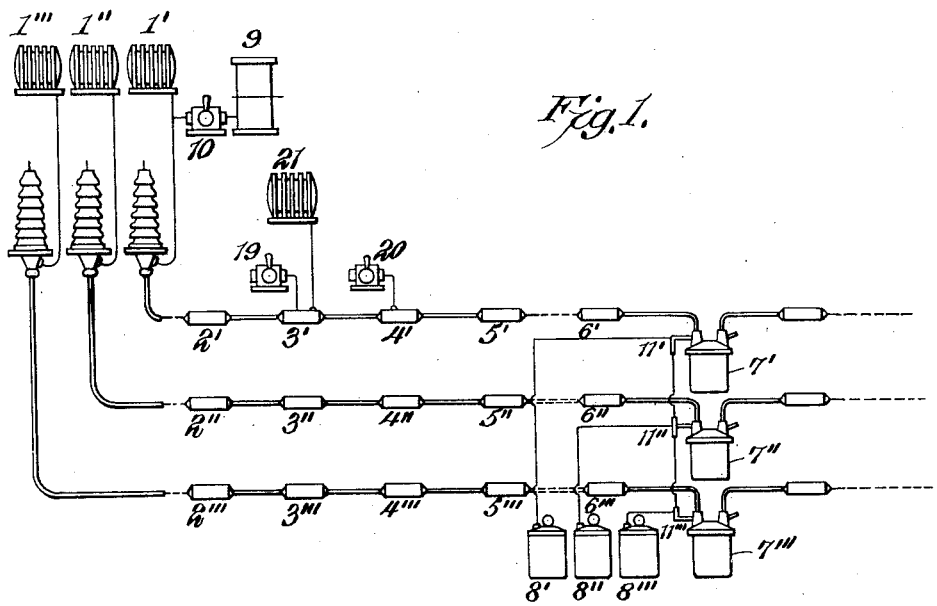
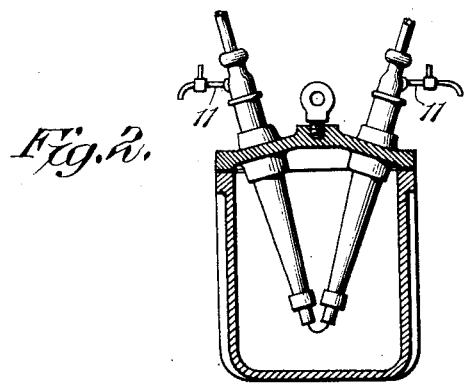
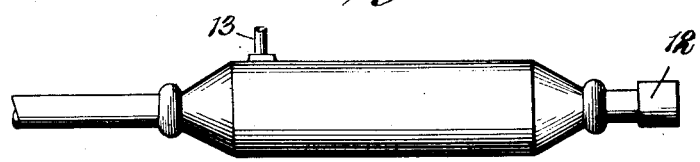
Inventor,
Mario Puritz,
By Emil Bönnelycke
Attorney Patented Oct. 18, 1938

2,133,399

UNITED STATES PATENT OFFICE 2,133,399

ELECTRIC CABLE AND METHOD OF REPAIRING THE SAME

Mario Puritz, London, England, assignor to Societa Italiana Pirelli, Milan, Italy, a corporation of Italy Original application April 25, 1929, Serial No. 358,092. Divided and this application November 7, 1930, Serial No. 494,102. In France March 26, 1930

8 Claims. (Cl. 173—264)

The present application is a division of my prior application Serial No. 358,092, filed April 25, 1929.

My invention is directed more specifically to that type of cable designed to be placed in underground conduits, which comprises an insulated conductor, an enclosing metal sheath and one or more ducts or channels within the sheath which are filled with insulating fluid, such as oil for example, under a pressure greater than that of the atmosphere. It is the common practice for high tension circuits of multi-phase systems of alternating current distribution to provide a separate cable for each of the phases. Each cable is made in relatively short lengths for convenience in handling and installing and the lengths after being installed are united electrically by suitable hollow conductors through which the insulating fluid is free to flow. To limit the fluid pressure in any one or more parts of the cable due to hydrostatic head the entire cable line is divided into sections, each section being composed of one or more lengths of cable, adjacent lengths being separated by means of stop joints, which joints permit the current to freely flow but prevent the flow of fluid from one section or part to another.

Sealed fluid containing reservoirs called "feeding reservoirs" and sealed reservoirs called "pressure reservoirs" are provided both of which communicate with the duct or channel of each phase of the cable and into which fluid is free to flow from the cable as it heats and from which it flows into the cable as it cools.

Cable systems of the character described have been installed in New York city and Chicago and have been described in considerable detail in the technical press as for example in the Proceedings of the A. I. E. E. meeting of November 28–30, 1927.

As will be evident from the foregoing the entire cable of each phase is filled with oil or other insulating fluid, and hence if a rupture of a sheath or joint casing thereof should occur the fluid will escape. On the other hand faults of a different character may develop in the cable length due to various causes. In any event when a length is injured from any cause it is necessary to remove it and substitute a new one.

My invention has for its object to provide an arrangement of parts and a method of procedure whereby this substitution may be accomplished without draining or otherwise affecting the entire cable or a long length thereof, or permtting the admission of air or moisture to the interior of the cable, for when a cable is drained wholly or in large part it has to be re-evacuated and treated and then re-filled with fluid, which is a very expensive operation and requires a considerable period of time.

For this purpose it is necessary to maintain the undamaged portions of the cable continuously under oil pressure superior to the external pressure, while substituting a new length for the damaged length.

This can be realized by rendering quickly available an additional supply of insulating fluid in case of a fault in the cable, so that fluid in suitable amount may be supplied from opposite sides of the fault to prevent the entrance of air or moisture to the cable and compensate for any leakage which may occur.

In order that the said invention may be clearly understood and readily carried into effect, the same will now be described more fully with reference to the accompanying drawing in which:—

Figure 1 is a diagrammatic illustration of a high tension oil-filled cable system; Figure 2 is a sectional and diagrammatic view of a fluid stop joint; Figure 3 is a detail view of a joint casing.

The feeding reservoirs $1'$, $1''$, $1'''$ shown in Fig. 1 are connected to the cable ends near the terminals by means of pipes. These reservoirs are of the collapsible type, like those described for instance in the specification of the English Emanueli Patent No. 255,034. The abutting lengths of cable are joined together by means of joints $2'$, $2''$, $2'''$—$6'$, $6''$, $6'''$.

The entire cable line or run is divided into sections, adjacent sections being separated by means of stop joints. In Figure 1 are shown the stop joints $7'$, $7''$, $7'''$ which limit the first section of the line. Following these stop joints a second section begins as shown in the drawing. The stop joint, which is diagrammatically illustrated in Figure 2, may be of any suitable construction, as for example that shown in the U. S. A. patent to Emanueli No. 1,698,051, issued January 8th, 1929.

Some installations may also be provided with other types of reservoirs commonly callled "pressure reservoirs". These latter serve to control the pressure of the oil at the end of the section remote from the point where the feeding reservoirs are placed, and can be of any of the types described in the specification to the English Emanueli Patent No. 267,059. In the system shown in Figure 1 the pressure reservoirs $8'$, $8''$, $8'''$, are shown at the end of the first section.

To carry out the operation of repairing a cable system like those described above according to the present invention, it is first of all necessary to maintain the entire section of faulty cable under oil pressure, a supply of oil being provided from both sides of the fault.

In the case of the installation illustrated in Figure 1 let us suppose that the fault is in the first section of the line between the joints $3'$ and $4'$. The necessary supply of fluid under pressure can be assured to this section by establishing interconnections between the duct or the feeding reservoir of the damaged phase and the ducts or the feeding reservoirs of the other adjacent phases.

A simple way for example to accomplish said interconnections between the ducts of different phases is given by the above mentioned stop joints, which are provided with suitable devices 11 as shown in Figure 2 commonly called "pig-tails", one on each side, which are adapted to receive the suction pipe of the vacuum pumps used in evacuating the cable and later to receive the pipes for admitting degasified oil or other insulating fluid to the cable. These devices are so arranged that communication can be established between the oil duct in the channel within the cable and the outside of the joint casing. In practice the stop joints of the different phases are located close together so that said intercommunications can be easily established by means of pipes or short lengths of rubber hose fastened to the pig-tails, suitable devices for pinching the hose to shut off the flow of fluid being provided whenever necessary. In this manner a variety of interconnections between the stop joints of the different phases can be made and insulating fluid from one phase can be conveyed through these pig-tail connections to one or more of the other phases.

A like installation of interconnections can also be established between the feeding reservoirs of different phases, and in this manner the supply of insulating oil is also assured from the other end of the section.

In Figure 1 is illustrated for example a connection effected between the pig-tails 11', 11'', 11''' of the stop joints 7', 7'', 7''', so that these may be put into communication with the oil ducts of the three cables forming the first section.

An additional supply of insulating fluid to a faulty section of cable can also be provided by establishing, as shown in Figure 1, an auxiliary reservoir 9 which can be connected by means of a tube to that feeding reservoir which feeds the injured cable, the reservoir 1' for example.

An auxiliary supply reservoir for the purpose of maintaining the necessary additional oil supply to a faulty section can also be connected to a joint placed near the fault, to one side or the other of same.

Fig. 3 represents the casing of a joint which is provided with a connection 13 adapted to receive the pipe for said additional oil supply.

What I claim as new and desire to secure by Letters Patent of the United States is:—

1. A high tension oil filled electric cable system including a plurality of parallel runs of oil filled cables containing longitudinal ducts, feeding reservoirs for supplying insulating fluid to the ducts of the runs of cable, stop joints connecting sections of the runs of cable, manually operable means to allow fluid access to the interiors of said runs of cable, and conduit means for interconnecting the fluid conveying ducts of runs of cable with those of adjacent runs of cable through said manually operable means adjacent said stop joints.

2. A high tension oil filled electric cable system including a plurality of parallel runs of oil filled cables containing longitudinal ducts, feeding reservoirs for supplying insulating fluid to the ducts of the runs of cable, stop joints connecting sections of said runs of cable, manually operable means to allow fluid access to the interiors of said runs of cable adjacent said stop joints, and means for predisposing interconnections between the supply reservoir of a run of cable and the supply reservoirs of adjacent runs of cable through said manually operable means.

3. A high tension oil filled electric cable system including a plurality of parallel runs of oil filled cables containing longitudinal ducts, feeding reservoirs for supplying insulating fluid to the ducts of the runs of cable, stop joints connecting sections of the runs of cable, manually operable means to allow fluid access to the interiors of said runs of cable, and conduit means for interconnecting the fluid conveying ducts of faulty runs of cable with those of adjacent runs of cable through said manually operable means adjacent said stop joints.

4. In a liquid filled cable system, the combination of a plurality of parallel runs of cable, said cable comprising insulation filled with liquid dielectric and having longitudinal ducts for liquid dielectric, stop joints for interrupting the longitudinal ducts, supply means for supplying liquid dielectric to the ducts of the corresponding runs of cable, and means for connecting the supply means together for supplying liquid dielectric to a fault in the sheath of a cable length.

5. In a run of cable comprising parallel oil filled cables, the method of maintaining an outward flow of oil at a leak in the sheath of one cable having a longitudinal duct which comprises, feeding oil through the duct in the injured cable on one side of the injury in one direction and feeding oil from the duct of an adjacent cable to the remote end to establish a flow toward the injury in the opposite direction.

6. In combination, a plurality of independent electric cables, each comprising an insulated conductor, an enclosing sheath and an internal duct containing liquid insulation, a reservoir for each cable normally feeding liquid independently to the duct thereof, and means for interconnecting the duct of one cable with that of another while maintaining the electrical independence of said cables.

7. In combination, a plurality of parallel independent fluid filled electric cables, each comprising a plurality of sections of insulated conductors, an enclosing sheath and an internal duct containing liquid insulation being associated with each conductor, stop joints for uniting the cable sections, a reservoir for each cable normally feeding liquid independently to the duct thereof at a point remote from a joint, and means interconnecting the ducts of the parallel cables at certain of the stop joints for transmitting liquid from one cable duct to that of another to augment the supply of liquid therein to replace loss.

8. The combination with a pair of sheathed oil filled electric cables, of a feeding reservoir connected to one point of each thereof for supplying oil thereto under pressure, and means for connecting said cables together at another widely separated point, whereby oil may flow through the entire length of one cable into the other, and back along such other in a direction opposite to that in which oil normally flows therein from its feeding reservoir.

MARIO PURITZ.